US012800502B2

(12) United States Patent
Lim et al.

(10) Patent No.: US 12,800,502 B2
(45) Date of Patent: Nov. 17, 2026

(54) ANALYSIS APPARATUS AND METHOD OF ANALYZING CONTENT OF MATERIAL USING THE SAME

(71) Applicant: Samsung Display Co., Ltd., Yongin-si (KR)

(72) Inventors: Yong Woon Lim, Seoul (KR); Hyo-Jin Kim, Seoul (KR); Tae Hyun Kim, Siheung-si (KR); Hye Kyung Shin, Yongin-si (KR); Kyonghun Lee, Namyangju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 286 days.

(21) Appl. No.: 18/151,948

(22) Filed: Jan. 9, 2023

(65) Prior Publication Data

US 2023/0280276 A1 Sep. 7, 2023

(30) Foreign Application Priority Data

Mar. 3, 2022 (KR) ........................ 10-2022-0027717

(51) Int. Cl.
*G01N 21/65* (2006.01)
*G01J 3/02* (2006.01)
*G01J 3/44* (2006.01)

(52) U.S. Cl.
CPC ............ *G01N 21/65* (2013.01); *G01J 3/0216* (2013.01); *G01J 3/4412* (2013.01)

(58) Field of Classification Search
CPC ........................... G01N 21/65; G01J 2003/102
See application file for complete search history.

(56) References Cited

U.S. PATENT DOCUMENTS 4,893,008 A * 1/1990 Horikawa .......... G02B 21/0076 250/234
6,558,820 B2 5/2003 Raychaudhuri et al.
6,657,216 B1 * 12/2003 Poris .................. G01B 11/0608 250/559.22
6,939,660 B2 9/2005 Tutt et al.
(Continued)

FOREIGN PATENT DOCUMENTS

CN 113866152 A 12/2021
JP H10-90064 A 4/1998
(Continued)

OTHER PUBLICATIONS

Nanophoton Products; Laser Raman Microscope; “Sophisticated high performance RAMANtouch”; www.nanophoton.net; 16pp.
(Continued)

*Primary Examiner* — Michelle M Iacoletti
*Assistant Examiner* — Mohamed Doumbia
(74) *Attorney, Agent, or Firm* — Womble Bond Dickinson (US) LLP

(57) ABSTRACT

An analysis apparatus includes a laser irradiation unit that irradiates a laser beam, a beam scanner that moves along a pattern to change a position at which the laser beam is irradiated to a sample, a first lens through which a light provided from the sample is transmitted, an optical member to which the light that passes through the first lens is provided and through which a pin hole is defined, and a detection unit that detects a detection light passed through the pin hole.

19 Claims, 9 Drawing Sheets

(56) References Cited

U.S. PATENT DOCUMENTS

| | | | | |
|---|---|---|---|---|
| 7,329,466 | B2 | 2/2008 | Vargas et al. | |
| 7,888,863 | B2 | 2/2011 | Shin et al. | |
| 7,906,228 | B2 | 3/2011 | Lee et al. | |
| 7,910,935 | B2 | 3/2011 | Seong | |
| 8,148,891 | B2 | 4/2012 | Tung et al. | |
| 8,153,279 | B2 | 4/2012 | Eum et al. | |
| 8,258,501 | B2 | 9/2012 | Werner et al. | |
| 8,338,843 | B2 | 12/2012 | Schindler et al. | |
| 8,476,121 | B2 | 7/2013 | Burroughes et al. | |
| 8,487,344 | B2 | 7/2013 | Seong | |
| 8,614,357 | B2 | 12/2013 | Bagala'Rampazzo et al. | |
| 8,829,442 | B2 | 9/2014 | Heaven et al. | |
| 9,276,223 | B2 | 3/2016 | Hartmann et al. | |
| 9,297,980 | B2 | 3/2016 | Kimura | |
| 9,645,086 | B2 | 5/2017 | Nakai | |
| 9,666,822 | B2 | 5/2017 | Forrest et al. | |
| 9,759,662 | B2 | 9/2017 | Nishizawa et al. | |
| 10,361,403 | B2 | 7/2019 | Langguth et al. | |
| 10,366,653 | B2 | 7/2019 | Kwon et al. | |
| 10,488,252 | B1 | 11/2019 | Vakshoori et al. | |
| 10,692,417 | B2 | 6/2020 | Lee et al. | |
| 10,935,492 | B2 | 3/2021 | Ghosh et al. | |
| 11,248,962 | B2 | 2/2022 | Aizawa et al. | |
| 2004/0142098 | A1 | 7/2004 | Ghosh et al. | |
| 2007/0132994 | A1 * | 6/2007 | Kobayashi | G01J 3/44<br>356/328 |
| 2008/0125609 | A1 | 5/2008 | Vestweber et al. | |
| 2009/0078317 | A1 | 3/2009 | Kim et al. | |
| 2009/0230852 | A1 | 9/2009 | Lee et al. | |
| 2009/0273277 | A1 | 11/2009 | Lee et al. | |
| 2009/0273278 | A1 | 11/2009 | Lee et al. | |
| 2010/0032658 | A1 | 2/2010 | Lee et al. | |
| 2010/0045170 | A1 | 2/2010 | Lee et al. | |
| 2010/0066241 | A1 | 3/2010 | Cho et al. | |
| 2010/0072888 | A1 | 3/2010 | Kim et al. | |
| 2010/0096982 | A1 | 4/2010 | Eum et al. | |
| 2010/0108997 | A1 | 5/2010 | Kim et al. | |
| 2011/0064296 | A1 | 3/2011 | Dixon | |
| 2012/0025177 | A1 | 2/2012 | Yoon et al. | |
| 2015/0192461 | A1 * | 7/2015 | Chen | G02B 21/0092<br>356/366 |
| 2015/0346101 | A1 * | 12/2015 | Zhao | G01N 21/47<br>356/301 |
| 2016/0322568 | A1 | 11/2016 | Fadhel et al. | |
| 2018/0114921 | A1 | 4/2018 | Rothe et al. | |
| 2023/0204515 | A1 * | 6/2023 | Vezard | G01N 21/65<br>356/301 |
| 2024/0060899 | A1 * | 2/2024 | Majidi | G01N 21/65 |

FOREIGN PATENT DOCUMENTS

| | | | | |
|---|---|---|---|---|
| JP | 2008-116432 | A | 5/2008 | |
| JP | 2012-73152 | A | 4/2012 | |
| JP | 2014-48300 | A | 3/2014 | |
| JP | 2015-225049 | A | 12/2015 | |
| JP | 6313116 | B2 | 4/2018 | |
| JP | 2018-146410 | A | 9/2018 | |
| JP | 2021-110636 | A | 8/2021 | |
| JP | 2021-526213 | A | 9/2021 | |
| KR | 10-2002-0086281 | A | 11/2002 | |
| KR | 10-2004-0068000 | A | 7/2004 | |
| KR | 10-2005-0122943 | A | 12/2005 | |
| KR | 10-0580815 | B1 | 5/2006 | |
| KR | 10-0645329 | B1 | 11/2006 | |
| KR | 10-2007-0024636 | A | 3/2007 | |
| KR | 10-2007-0038110 | A | 4/2007 | |
| KR | 10-0784382 | B1 | 12/2007 | |
| KR | 10-0784384 | B1 | 12/2007 | |
| KR | 10-0794304 | B1 | 1/2008 | |
| KR | 10-0850886 | B1 | 8/2008 | |
| KR | 10-0867028 | B1 | 11/2008 | |
| KR | 10-0901887 | B1 | 6/2009 | |
| KR | 10-0901888 | B1 | 6/2009 | |
| KR | 10-0910150 | B1 | 8/2009 | |
| KR | 10-2009-0111915 | A | 10/2009 | |
| KR | 10-0923197 | B1 | 10/2009 | |
| KR | 10-2010-0000121 | A | 1/2010 | |
| KR | 10-2010-0000772 | A | 1/2010 | |
| KR | 10-2010-0028168 | A | 3/2010 | |
| KR | 10-0946411 | B1 | 3/2010 | |
| KR | 10-2010-0041043 | A | 4/2010 | |
| KR | 10-2010-0048203 | A | 5/2010 | |
| KR | 10-2010-0048210 | A | 5/2010 | |
| KR | 10-0989815 | B1 | 10/2010 | |
| KR | 10-1004058 | B1 | 12/2010 | |
| KR | 10-2011-0052691 | A | 5/2011 | |
| KR | 10-2011-0098293 | A | 9/2011 | |
| KR | 10-2011-0101444 | A | 9/2011 | |
| KR | 10-2011-0113297 | A | 10/2011 | |
| KR | 10-2011-0121147 | A | 11/2011 | |
| KR | 10-2011-0131201 | A | 12/2011 | |
| KR | 10-1200863 | B1 | 11/2012 | |
| KR | 10-1212582 | B1 | 12/2012 | |
| KR | 10-2014-0023408 | A | 2/2014 | |
| KR | 10-2014-0024441 | A | 2/2014 | |
| KR | 10-1365853 | B1 | 2/2014 | |
| KR | 10-1384449 | B1 | 4/2014 | |
| KR | 10-1427799 | B1 | 8/2014 | |
| KR | 10-1456521 | B1 | 10/2014 | |
| KR | 10-1495547 | B1 | 2/2015 | |
| KR | 10-1546215 | B1 | 8/2015 | |
| KR | 10-1551207 | B1 | 9/2015 | |
| KR | 10-1554860 | B1 | 9/2015 | |
| KR | 10-1554862 | B1 | 9/2015 | |
| KR | 10-1561479 | B1 | 10/2015 | |
| KR | 10-1563140 | B1 | 10/2015 | |
| KR | 10-1563142 | B1 | 10/2015 | |
| KR | 10-1567661 | B1 | 11/2015 | |
| KR | 10-1641862 | B1 | 7/2016 | |
| KR | 10-2016-0102529 | A | 8/2016 | |
| KR | 10-1661797 | B1 | 10/2016 | |
| KR | 10-1705136 | B1 | 2/2017 | |
| KR | 10-1742782 | B1 | 6/2017 | |
| KR | 10-1757888 | B1 | 7/2017 | |
| KR | 10-1766379 | B1 | 8/2017 | |
| KR | 10-1807410 | B1 | 12/2017 | |
| KR | 10-2018-0044822 | A | 5/2018 | |
| KR | 10-2018-0068310 | A | 6/2018 | |
| KR | 10-2019-0000759 | A | 1/2019 | |
| KR | 10-1917114 | B1 | 1/2019 | |
| KR | 10-1939406 | B1 | 1/2019 | |
| KR | 10-2125584 | B1 | 7/2020 | |
| KR | 10-2141012 | B1 | 8/2020 | |
| KR | 10-2020-0132997 | A | 11/2020 | |
| KR | 10-2021-0044019 | A | 4/2021 | |
| KR | 10-2245300 | B1 | 4/2021 | |
| WO | WO-2015005073 | A1 * | 1/2015 | G01N 21/65 |

OTHER PUBLICATIONS

Nanophoton Corporation; Specification; Model # RAMANtouch Inline CFL, Nanophoton Corporation., Dec. 4, 2020; 5pp.

* cited by examiner

ANALYSIS APPARATUS AND METHOD OF ANALYZING CONTENT OF MATERIAL USING THE SAME

CROSS-REFERENCE TO RELATED APPLICATION

This application claims priority to and the benefit of Korean Patent Application No. 10-2022-0027717, filed on Mar. 3, 2022, in the Korean Intellectual Property Office, the entire contents of which are hereby incorporated by reference.

BACKGROUND

1. Field

Embodiments of the present disclosure relate to an analysis apparatus having improved accuracy and reliability and a method of analyzing a content or composition of a material using the analysis apparatus.

2. Description of the Related Art

Molecular and optical properties of materials can be measured using Raman spectroscopy. Raman spectroscopy measures vibrational energy of a material by observing a decrease or increase in the energy of scattered light compared to Rayleigh scattering. A spectrum shows a shift amount of the scattered light as a Raman shift, and the Raman shift corresponds to a vibration frequency of a molecule being analyzed. Qualitative and quantitative analysis of substances are performed using a spectrum in which intensity of the scattered light is represented as a band or series of peaks according to frequency. A fluorescence noise is included when measuring the intensity of the scattered light.

SUMMARY

Embodiments of the present disclosure provide an analysis apparatus having improved accuracy and reliability.

Embodiments of the present disclosure provide a method of analyzing a content or composition of a material using the analysis apparatus.

Embodiments of the present disclosure provide an analysis apparatus including a laser irradiation unit that irradiates a laser beam that is a monochromatic light, a beam scanner that moves along a pattern to change a position at which the laser beam is irradiated to a sample, a first lens through which a light provided from the sample is transmitted, an optical member to which the light passed through the first lens is provided and through which a pin hole is defined, and a detection unit that detects a detection light passed through the pin hole. The detection light detected by the detection unit is a Raman scattered light.

The analysis apparatus further includes a spectral processing unit that processes the Raman scattered light as a spectrum.

The laser irradiation unit includes a first laser that irradiates a first laser beam and a second laser that irradiates a second laser beam having a wavelength different from a wavelength of the first laser beam, and the laser irradiation unit outputs the first laser beam or the second laser beam according to a type (e.g., composition) of the sample.

The analysis apparatus further includes a second lens between the laser irradiation unit and the beam scanner on a travel path of the laser beam.

The analysis apparatus further includes a focus control lens between the second lens and the beam scanner on the travel path of the laser beam, and the focus control lens controls a position of a focal point of the laser beam.

The beam scanner repeatedly moves along the pattern and repeatedly irradiates the laser beam to the sample, and the pattern is a single closed curve line.

A plurality of points is defined in the sample, and the pattern has a shape corresponding to a shape obtained by connecting the points.

The analysis apparatus further includes a focus control lens between the beam scanner and the sample, and the focus control lens controls a position of a focal point of the laser beam.

The analysis apparatus further includes a beam splitter between the laser irradiation unit and the beam scanner on a travel path of the laser beam, and the beam splitter changes the travel path of the laser beam.

The analysis apparatus further includes a first half-mirror between the beam splitter and the first lens on a travel path of the light provided from the sample, and the first half-mirror changes the travel path of the light provided from the sample.

The analysis apparatus further includes a light irradiation unit that emits a white light, and the laser irradiation unit irradiates the laser beam when the light irradiation unit is not emitting the white light to the sample.

The analysis apparatus further includes a third lens in front of the light irradiation unit and that transmits the white light.

The analysis apparatus further includes a second half-mirror that changes a travel path of the white light that passes through the third lens.

The analysis apparatus further includes a microscope to which a light reflected by the sample is incident after passing through the second half-mirror.

Embodiments of the present disclosure provide an analysis method including irradiating a white light from a light irradiation unit to a sample, irradiating a laser beam that is a high-intensity monochromatic light from a laser irradiation unit to the sample when the light irradiation unit is not irradiating the white light to the sample, converting the laser beam to a detection light such that the detection light is incident to an optical system, and detecting the detection light using a detection unit.

The analysis method further includes analyzing a Raman peak detected in the detection light to analyze an intrinsic component of the sample.

The analysis method further includes quantifying a component of the sample using an intensity of the Raman peak, which corresponds to the intrinsic component of the sample, to analyze a material content of the sample.

The converting of the laser beam to the detection light includes providing a focus control lens above the sample, moving the focus control lens in a thickness direction of the sample, and analyzing a component for each layer of the sample.

The analyzing of the component for each layer of the sample is performed by a two-dimensional analysis analyzing the component of the sample in a specific plane.

The analyzing of the component for each layer of the sample is performed by a three-dimensional analysis analyzing the component of the sample with respect to a plurality of layers and synthesizing an analyzed results of the component.

According to the above, a dopant content of a sample is quantified using the Raman peak of the Raman spectrum measured by the analysis apparatus. The analysis apparatus is able to quantify the dopant content with respect to a sample having an ultra-thin thickness and/or a sample including a trace amount of a dopant. In addition, the analysis apparatus is able to quantify the dopant content of each of plurality of layers of the sample using a confocal function.

According to the above, the Raman peak of the sample from which a fluorescence noise is removed is obtained using the analysis apparatus that includes the laser irradiation unit, the beam scanner, the first lens, and the optical member through which the pin hole is defined. Accordingly, a reliability of data required to quantify the content of a material is improved. The analysis apparatus has a linear correlation of about 99.96%, which verifies the accuracy thereof, and it is observed that the reliability of the analysis apparatus is improved through the results of repeated reproducibility tests.

BRIEF DESCRIPTION OF THE DRAWINGS

The above and other features of embodiments of the present disclosure will become readily apparent by reference to the following detailed description when considered in conjunction with the accompanying drawings wherein.

DETAILED DESCRIPTION

Figure 1A:
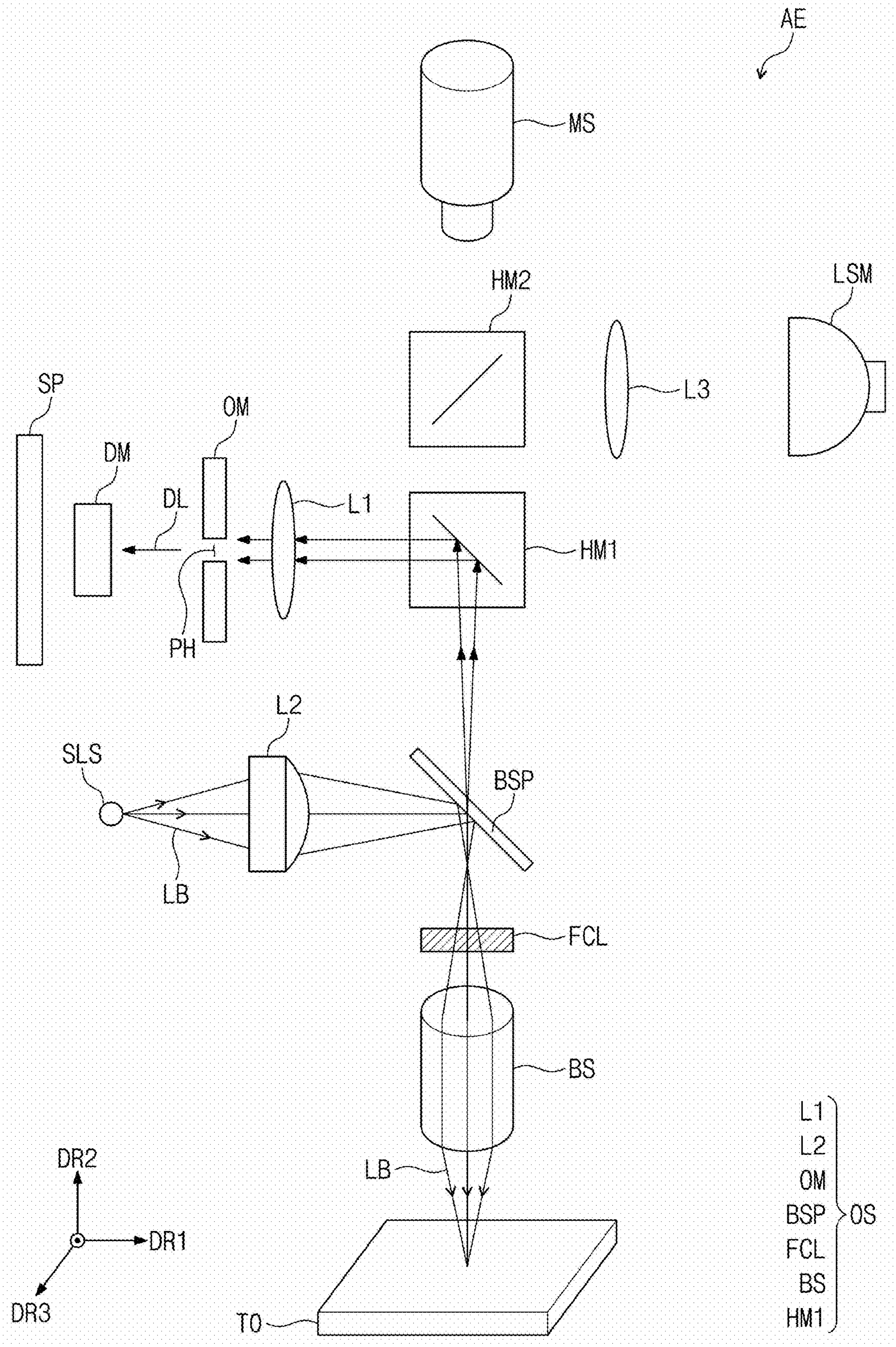
FIGS. 1A and 1B are views of an analysis apparatus according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, thicknesses, ratios, and dimensions of components may be exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the spirit and scope of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

The term "part" or "unit," as used herein, is intended to mean a software component and/or a hardware component that performs a set or specific function. The hardware component may include, for example, a field-programmable gate array (FPGA) and/or an application-specific integrated circuit (ASIC). The software component may refer to an executable code and/or data used by the executable code in an addressable storage medium. Thus, the software components may be, for example, object-oriented software components, class components, and/or task components, and may include processes, functions, attributes, procedures, subroutines, segments of program code, drivers, firmware, micro codes, circuits, data, a database, data structures, tables, arrays, and/or variables.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to the accompanying drawings.

Figure 1B:
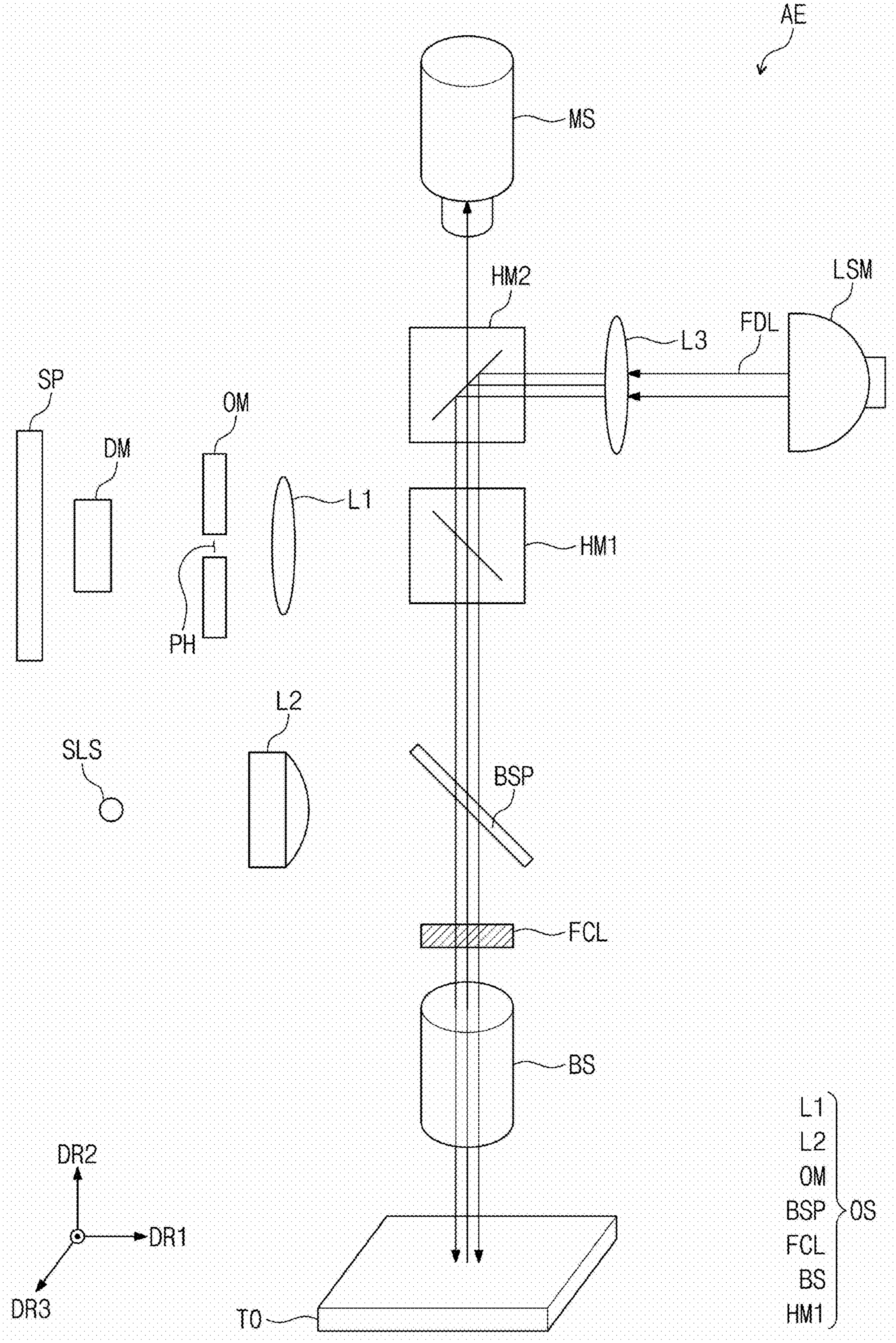

FIGS. 1A and 1B are views of an analysis apparatus AE according to an embodiment of the present disclosure. FIG. 1A shows a path of a laser beam LB irradiated by a laser irradiation unit SLS, and FIG. 1B shows a path of a white light FDL irradiated by a light irradiation unit LSM.

Referring to FIGS. 1A and 1B, the analysis apparatus AE may include the laser irradiation unit SLS, an optical system OS, a detection unit DM, a spectral processing unit SP, the light irradiation unit LSM, a third lens L3, a second half-mirror HM2, and a microscope MS.

Referring to FIG. 1A, the laser irradiation unit SLS may irradiate the laser beam LB. The laser beam LB may be a high-intensity monochromatic light. The laser irradiation unit SLS may include a first laser that irradiates a first laser beam and a second laser that irradiates a second laser beam. The first laser beam may have a wavelength different from a wavelength of the second laser beam. The laser irradiation unit SLS may emit (irradiate) the first laser beam or the second laser beam according to a type (e.g., composition) of a sample TO. Accordingly, the laser beam LB may be the first laser beam or the second laser beam.

In the present embodiment, the laser irradiation unit SLS including two lasers (the first laser and the second laser) is shown as a representative example, however, the number of lasers should not be limited thereto or thereby. As an example, the laser irradiation unit SLS may include only one laser or three or more lasers.

The laser beam LB may be incident to the optical system OS and may be converted to a detection light DL. The optical system OS may include a second lens L2, a beam splitter BSP, a focus control lens FCL, a beam scanner BS, a first half-mirror HM1, a first lens L1, and an optical member OM.

The second lens L2 may be on a travel path of the laser beam LB and may be between the laser irradiation unit SLS and the beam scanner BS on the travel path of the laser beam LB. The second lens L2 may refract the laser beam LB irradiated by the laser irradiation unit SLS. The second lens L2 may condense the laser beam LB, and the laser beam LB may be focused on the sample TO by the second lens L2 and other components to be further described herein below.

The beam splitter BSP may be above the sample TO. In more detail, the beam splitter BSP may be between the laser irradiation unit SLS and the beam scanner BS on the travel path of the laser beam LB. The beam splitter BSP may change the travel path of the laser beam LB.

The focus control lens FCL may be between the second lens L2 and the beam scanner BS on the travel path of the laser beam LB. The focus control lens FCL may move in a second direction DR2 and may control a position of a focal point of the laser beam LB. As an example, the focus control lens FCL may move in a thickness direction of the sample TO to control the position of the focal point of the laser beam LB. The position of the focal point may be controlled to be present inside the sample TO. As a result, a component analysis of each layer of the sample TO may be performed. The component analysis of each layer of the sample TO may include at least one selected from a two-dimensional analysis and a three-dimensional analysis. The two-dimensional analysis of the sample TO may be performed on one layer to analyze the component of the sample in a set or specific plane of the layer. The three-dimensional analysis of the sample TO may be performed on a plurality of layers to analyze the component of the sample in a set or specific plane of the plurality of layers and to synthesize the planar analysis with respect to the plurality of layers, and thus, the component of the sample TO may be three-dimensionally analyzed.

FIG. 1A shows a structure in which the focus control lens FCL is between the second lens L2 and the beam scanner BS as a representative example, however, the present disclosure should not be limited thereto or thereby. As an example, the focus control lens FCL may be between the beam scanner BS and the sample TO and may control the position of the focal point of the laser beam LB.

The sample TO may be a subject of analysis to be performed by the analysis apparatus AE. The sample TO may be substantially parallel to a plane defined by a first direction DR1 and a third direction DR3, the plane being perpendicular or substantially perpendicular to the second direction DR2. The beam scanner BS may irradiate or transmit the laser beam LB to the sample TO. The beam scanner BS may change a position of the laser beam LB irradiated to the sample TO. For example, the beam scanner BS may change a horizontal position of the laser beam LB on the plane defined by the first direction DR1 and the third direction DR3. The beam scanner BS may irradiate the laser beam LB while moving along a pattern PAT (refer to FIG. 2).

The first half-mirror HM1 may be between the beam splitter BSP and the first lens L1 on a travel path of a light provided from the sample TO (e.g., a light reflected from the sample TO). The first half-mirror HM1 may change the travel path of the light provided from the sample TO.

The first lens L1 may be between the first half-mirror HM1 and the optical member OM. The light provided from the sample TO may be transmitted through the first lens L1. The first lens L1 may refract the light provided from the sample TO.

The optical member OM may be between the first lens L1 and the detection unit DM. The optical member OM may be provided with a pin hole PH defined therethrough, a portion of the light provided from the sample TO may be transmitted through the pin hole PH after passing through the first lens L1, and the other portion of the light may not be transmitted through the pin hole PH after passing through the first lens L1.

The detection unit DM may be between the optical member OM and the spectral processing unit SP. The detection unit DM may detect the detection light DL passing through the pin hole PH. The detection light DL detected by the detection unit DM may be a Raman scattered light.

The spectral processing unit SP may be adjacent to the detection unit DM. The spectral processing unit SP may process the Raman scattered light as a spectrum. FIG. 1A shows a structure in which the light is transmitted to the spectral processing unit SP after passing through the detection unit DM as a representative example, however, the present disclosure should not be limited thereto or thereby. As an example, the spectral processing unit SP may be located such that the detection light DL may be transmitted to the detection unit DM after passing through the spectral processing unit SP.

The analysis apparatus AE may measure (or determine) a molecular structure and optical properties of materials using Raman spectroscopy. The Raman spectroscopy may use Raman scattering that changes a wavelength of light. The Raman spectroscopy may measure a vibrational energy by observing a decrease or increase in the energy of scattered light compared to Rayleigh scattering. A spectrum may indicate how much the scattered light is shifted as a Raman shift, and the Raman shift may correspond to a vibration frequency of the molecule being analyzed. Qualitative and quantitative analysis of substances may be performed using a spectrum in which an intensity of the scattered light is represented as a band or series of peaks according to frequency. As an example, a dopant content of a semiconductor may be detected by using an optical characteristic in which an intensity of light becomes greater as the dopant content of the semiconductor increases.

Referring to FIG. 1B, the light irradiation unit LSM may irradiate the white light FDL. The third lens L3 may be in front of the light irradiation unit LSM. The third lens L3 may be between the light irradiation unit LSM and the second half-mirror HM2 on a travel path of the white light FDL. The third lens L3 may refract the white light FDL irradiated by the light irradiation unit LSM. The third lens L3 may refract the white light FDL, and the white light FDL may be focused on the sample TO.

The second half-mirror HM2 may be between the light irradiation unit LSM and the sample TO on the travel path of the white light FDL. The second half-mirror HM2 may change the travel path of the white light FDL after the white light FDL passes through the third lens L3.

A light reflected by the sample TO after passing through the second half-mirror HM2 may be incident into the microscope MS. The microscope MS may observe the sample TO. In more detail, the position of the sample TO may be observed using the microscope MS and the position of the sample TO may then be adjusted based on the observation using the microscope MS to irradiate the laser beam LB (refer to FIG. 1A) to a desired position of the sample TO.

Referring to FIGS. 1A and 1B, the light irradiation unit LSM may irradiate the white light FDL to the sample TO. After the light irradiation unit LSM is turned off, the laser irradiation unit SLS may irradiate the laser beam LB. In more detail, the light irradiation unit LSB may irradiate the white light FDL to check and adjust the position of the sample TO, and the laser irradiation unit SLS may irradiate the laser beam LB to the sample TO.

The laser beam LB may be incident to the optical system OS and may be converted to the detection light DL. The detection unit DM may detect the detection light DL. An intrinsic component of the sample TO may be analyzed by analyzing a Raman peak detected by the detection light DL, and thus, information about a composition of a substance in the sample TO may be obtained. In addition, the composition of the substance in the sample TO may be quantified by using an intensity of the Raman peak corresponding to the intrinsic component of the sample TO, and the content of the material for the sample TO may be analyzed by synthesizing the quantified substance's composition. Different from a conventional analysis apparatus, when the analysis apparatus AE of the present disclosure is used, even a sample TO having an ultra-thin thickness and trace substance content may be quantified. The ultra-thin thickness of the sample TO may be equal to or greater than 0.5 angstroms, and the trace substance content in the sample TO may be equal to or greater than about 0.1% (e.g., equal to or greater than about 0.1 wt % based on 100 wt % of the sample TO).

The analysis apparatus AE may perform a non-destructive analysis. As an example, during the manufacturing process of a display device, the analysis apparatus AE may analyze the content of the material of the sample TO in the middle of the process (e.g., during) without transferring the sample TO. Because the transferring of the sample TO is omitted, damage to the sample TO may be prevented or reduced.

Figure 2:
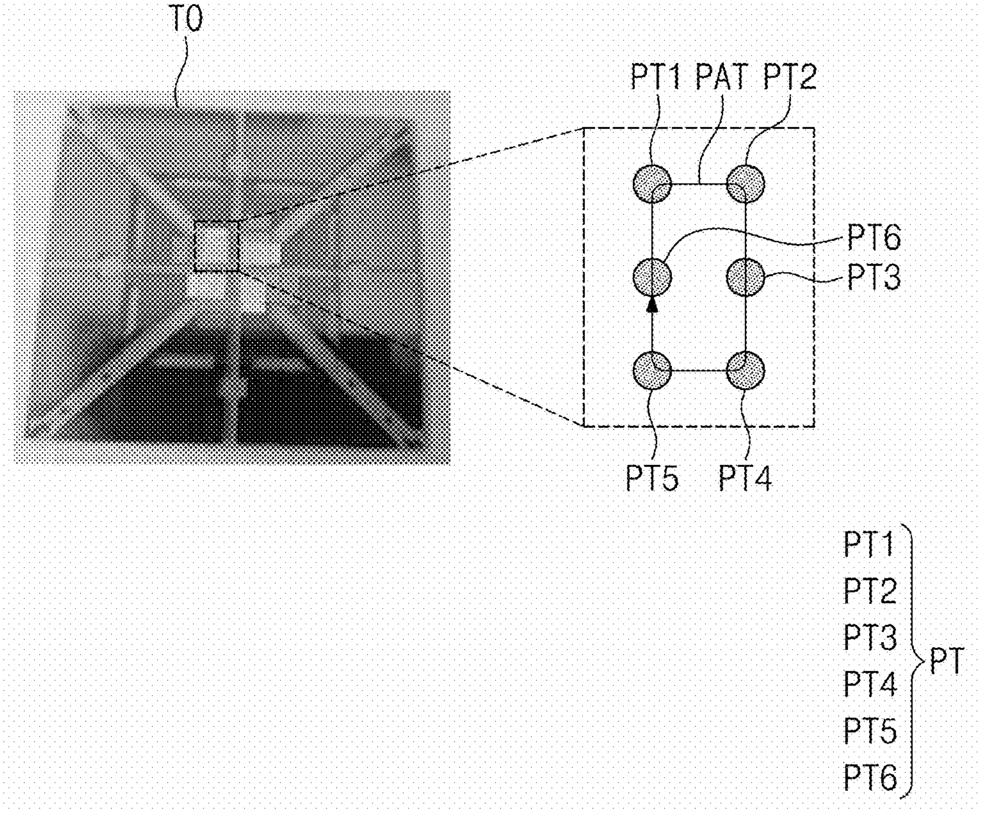
FIG. 2 is an image and enlarged view of a sample and a pattern of a laser beam irradiated to the sample according to an embodiment of the present disclosure.

FIG. 2 is an image of a sample TO and an enlarged view of the pattern PAT of the laser beam LB (refer to FIG. 1A) irradiated to the sample TO according to an embodiment of the present disclosure.

Referring to FIG. 2, a plurality of points PT may be defined in the sample TO. The points PT may include a first point PT1, a second point PT2, a third point PT3, a fourth point PT4, a fifth point PT5, and a sixth point PT6. FIG. 2 shows six points PT as a representative example, however, the number and positions of the points PT should not be limited thereto or thereby. The number and positions of the points PT may be smaller or greater than six depending on the size and the shape of the sample TO.

The pattern PAT to which the laser beam LB (refer to FIG. 1A) is irradiated may correspond to a shape obtained by connecting the points PT. As an example, when the first to sixth points PT1 to PT6 are sequentially connected, the pattern PAT may have a single closed curve shape. The shape of the pattern PAT of FIG. 2 is merely an example, and the pattern PAT may have a variety of suitable shapes.

The beam scanner BS (refer to FIG. 1A) may repeatedly move along the pattern PAT to repeatedly irradiate the laser beam LB (refer to FIG. 1A) to the sample TO. As an example, the laser beam LB (refer to FIG. 1A) may be irradiated 14 times along the pattern PAT of the single closed curve shape that sequentially connects the first to sixth points PT1 to PT6, and a total of eighty four (84) measurements may be made.

Figure 3A:
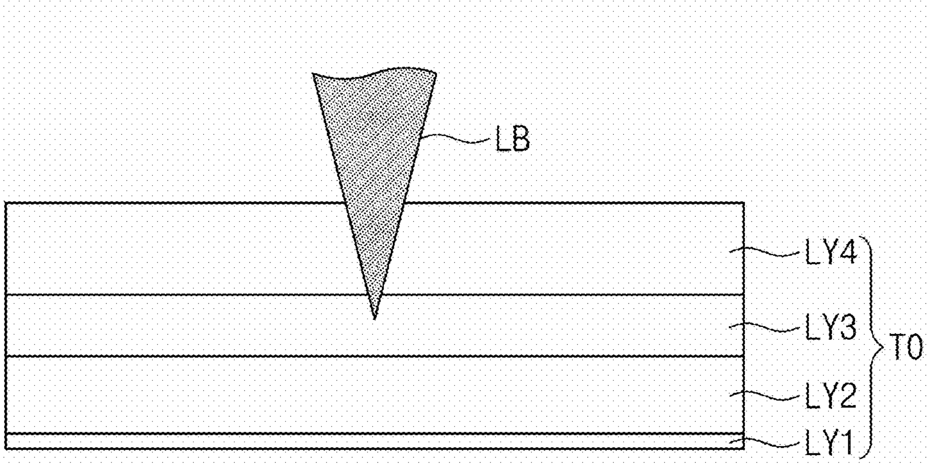
FIG. 3A is a cross-sectional view of a shape of a laser beam irradiated to a sample according to an embodiment of the present disclosure.
Figure 3B:
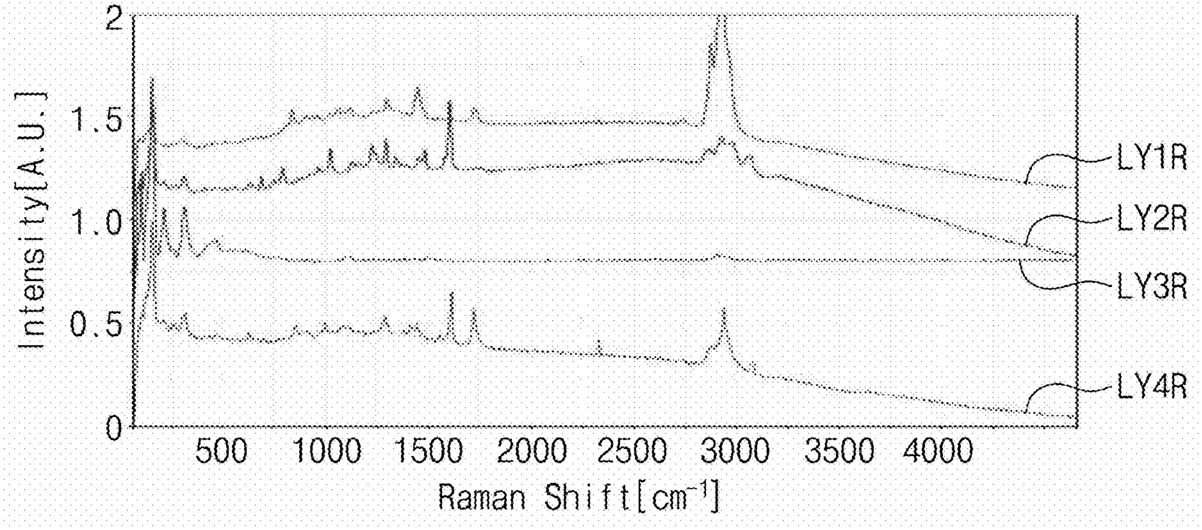
FIG. 3B is a graph showing a result of analyzing each layer of FIG. 3A using Raman spectroscopy.

FIG. 3A is a cross-sectional view of a shape of the laser beam LB irradiated to the sample TO according to an embodiment of the present disclosure. FIG. 3B is a graph showing a result of analyzing each layer of FIG. 3A using Raman spectroscopy.

Referring to FIG. 3A, the sample TO may include a first layer LY1, a second layer LY2, a third layer LY3, and a fourth layer LY4. A stack structure of the sample TO is merely an example, and the number of the stacked layers may be greater or smaller than four.

The laser beam LB may be a light that is passed through the focus control lens FCL (refer to FIG. 1A). The focus control lens FCL may control the position of the focal point of the laser beam LB, and as the position of the focal point of the laser beam LB is controlled, the focus of the laser beam LB may be on one selected from the first layer LY1, the second layer LY2, the third layer LY3, and the fourth layer LY4. As an example, when the focus of the focus control lens FCL matches with the focus of the first layer LY1, a portion other than a focal plane of the first layer LY1 may not appear on the detection unit DM (refer to FIG. 1A). In the same way, analysis results for each layer may be obtained with respect to the second, third, and fourth layers LY2, LY3, and LY4.

FIG. 3B is a graph showing the analysis results for each layer by the analysis method of FIG. 3A. An x-axis of the graph may represent a value of a Raman shift, and a y-axis of the graph may represent a value of an intensity of the light. First, second, third, and fourth spectra LY1R, LY2R, LY3R, and LY4R may include the analysis results respectively corresponding to the first layer LY1, the second layer LY2, the third layer LY3, and the fourth layer LY4. The analysis results may be obtained for each layer, and a content ratio of the composition for each layer may be obtained by analyzing the analysis results.

Figure 4:
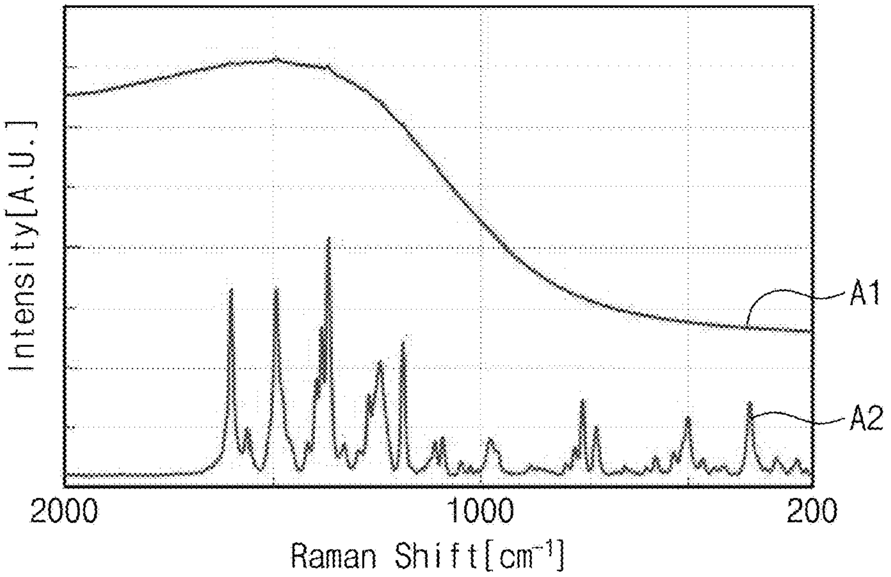
FIG. 4 is a graph showing a result of analyzing a sample by Raman spectroscopy using an analysis apparatus according to an embodiment of the present disclosure.

FIG. 4 is a graph showing a result of analyzing a sample by Raman spectroscopy using the analysis apparatus AE (refer to FIG. 1A) according to an embodiment of the present disclosure. FIG. 4 shows the graph measured by Raman spectroscopy by irradiating the first laser beam and the second laser beam having different wavelengths to the same material and the same position.

Referring to FIG. 4, the laser beam LB (refer to FIG. 1A) may have a wavelength of about 532 nm, about 785 nm, about 830 nm, or about 1064 nm. As an example, a first spectrum A1 may be a result value obtained by the first laser beam, and the first laser beam may have a wavelength of about 532 nm. A second spectrum A2 may be a result value obtained by the second laser beam, and the second laser beam may have a wavelength of about 785 nm. However, this is merely an example, and the wavelengths of the first laser beam and the second laser beam should not be limited thereto or thereby.

The first spectrum A1 shows the intensity of light, which includes a Raman peak and a fluorescence noise, and the second spectrum A2 shows the intensity of the light, which includes only a Raman peak without the occurrence of the fluorescence noise. Although the laser beam is irradiated to the same material and the same position, there may be wavelengths at which the fluorescence noise does not occur depending on the wavelength of the laser beam LB. Accordingly, the laser irradiation unit SLS (refer to FIG. 1A) may selectively irradiate the laser beam having the wavelength at which the fluorescence noise does not occur for each component of the sample TO (refer to FIG. 1A) to improve the reliability of composition analysis.

Figure 5:
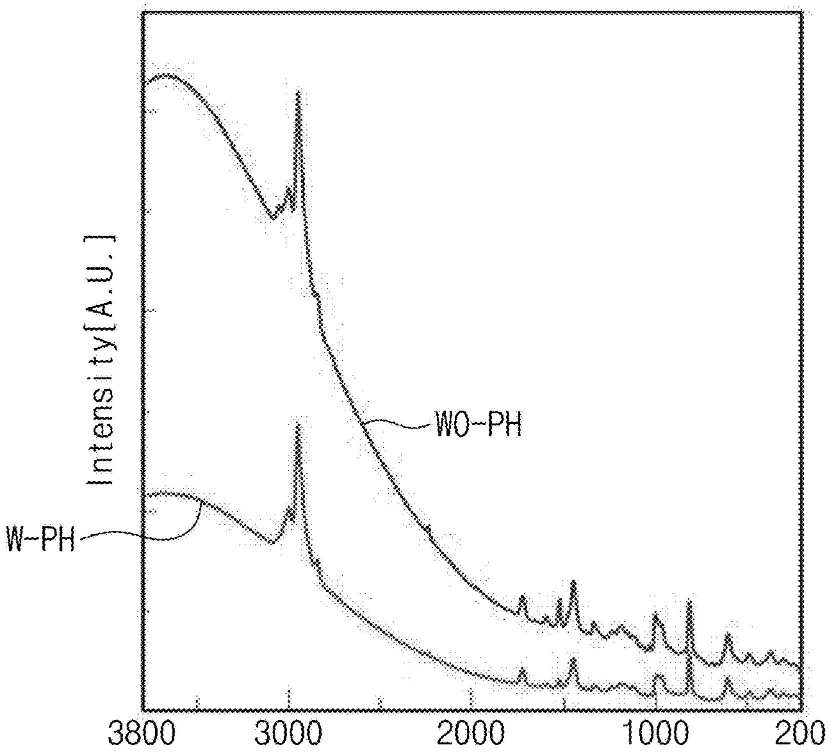
FIG. 5 is a graph showing a result of analyzing a sample by Raman spectroscopy using an analysis apparatus according to an embodiment of the present disclosure.

FIG. 5 is a graph showing a result of analyzing a sample by Raman spectroscopy using the analysis apparatus AE (refer to FIG. 1A) according to an embodiment of the present disclosure. FIG. 5 shows a first spectrum W-PH measured by the analysis apparatus AE (refer to FIG. 1A) including the optical member OM through which the pin hole PH (refer to FIG. 1A) is defined and a second spectrum WO-PH measured by an analysis apparatus that does not include the optical member OM through which the pin hole PH is defined.

Referring to FIGS. 1A and 5, the second spectrum WO-PH shows the intensity of light, which includes a plurality of noises and a Raman peak. The first spectrum W-PH shows the intensity of light, which only includes a Raman peak and from which some noises are removed. The scattered light caused by the laser beam LB may be reduced or eliminated by the pin hole PH. The scattered light caused by the laser beam LB may be generated from an area where the laser beam LB is concentrated and from areas other than the concentrated area. However, the scattered light in the areas where the laser beam LB is not concentrated may be transmitted through the first lens L1 but may not be transmitted through the pin hole PH. Accordingly, a Raman spectrum may be obtained only in a local area where the laser beam LB is concentrated in the sample TO.

Figure 6A:
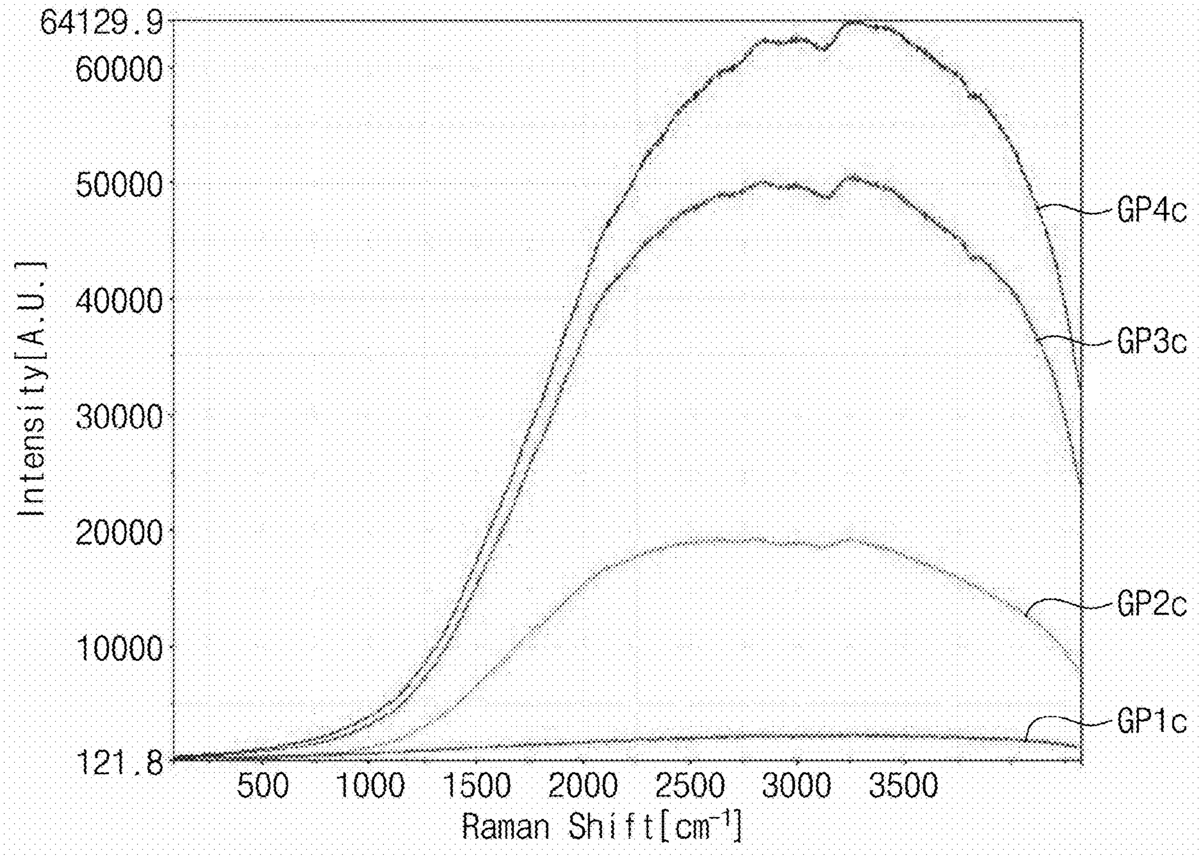
FIG. 6A is a graph showing a result of analyzing a sample by Raman spectroscopy using a conventional analysis apparatus.
Figure 6B:
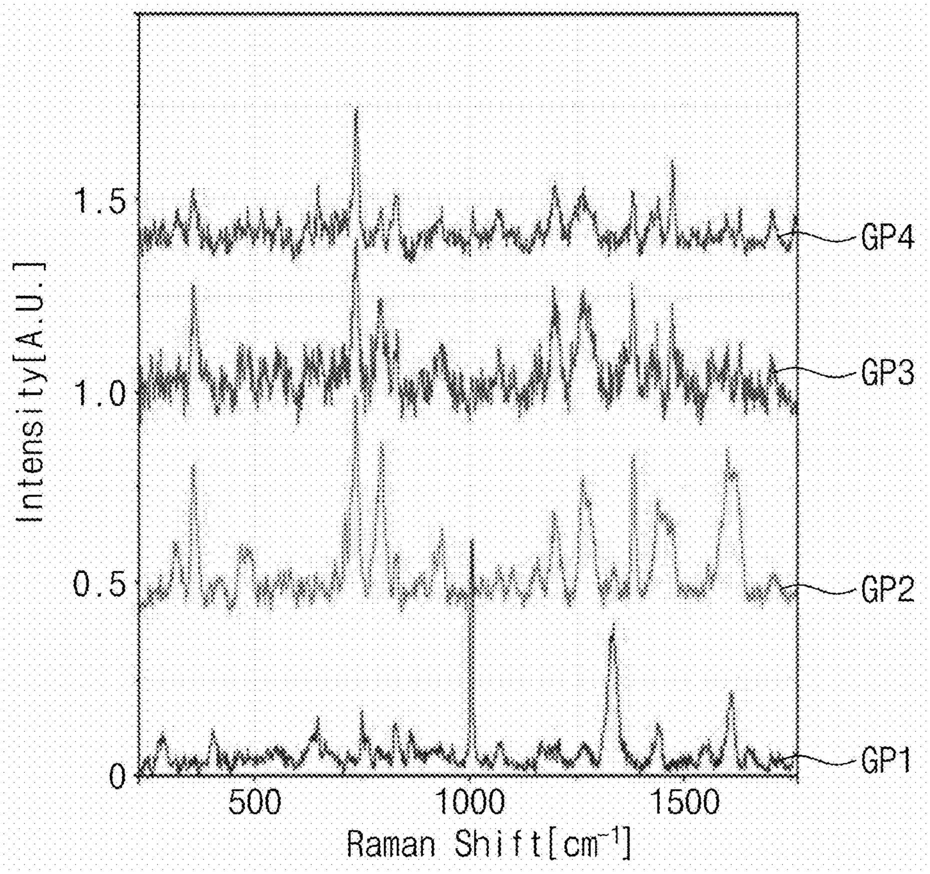
FIG. 6B is a graph showing a result of analyzing a sample by Raman spectroscopy using an analysis apparatus according to an embodiment of the present disclosure.

FIG. 6A is a graph showing a result of analyzing a sample by Raman spectroscopy using a conventional analysis apparatus. FIG. 6B is a graph showing a result of analyzing a sample by Raman spectroscopy using the analysis apparatus AE according to an embodiment of the present disclosure.

Referring to FIGS. 1A, 6A, and 6B, an x-axis of the graph represents a value related to a Raman shift, and a y-axis of the graph represents a value related to the intensity of the light. FIG. 6A shows Raman spectra GP1*c*, GP2*c*, GP3*c*, and GP4*c* in which fluorescence noise and other noises are included. When the analysis apparatus AE including the laser irradiation unit SLS, the beam scanner BS, the first lens L1, and the optical member OM through which the pin hole PH is defined is used, the Raman spectra GP1, GP2, GP3, and GP4 having a unique Raman peak from which the fluorescence noise is removed may be obtained. As the unique Raman peak excluding the fluorescence noise from the spectrum required for composition analysis may be calculated, a reliability of the composition analysis may be improved.

Figure 7A:
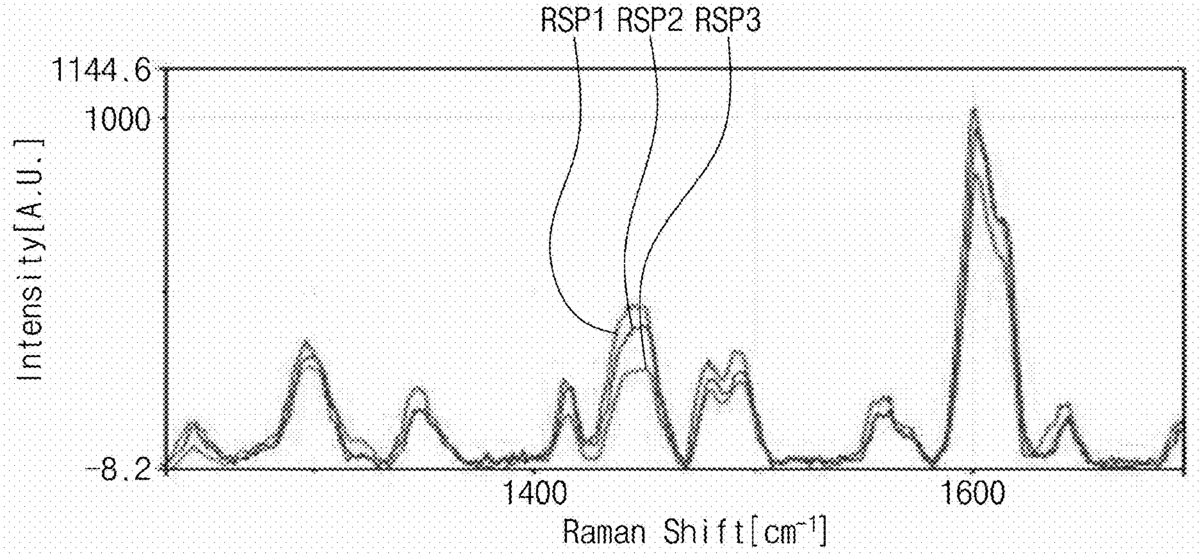
FIG. 7A is a graph showing a result of analyzing a sample by Raman spectroscopy using an analysis apparatus according to an embodiment of the present disclosure.
Figure 7B:
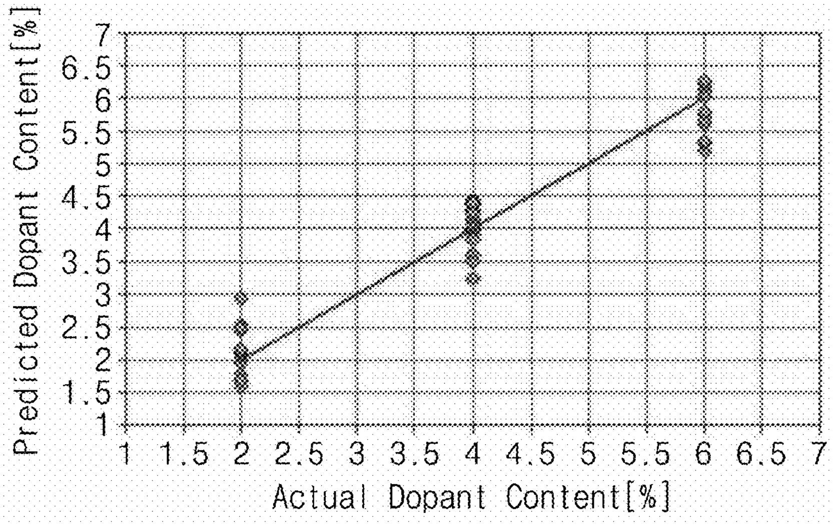
FIG. 7B is a graph showing a linear correlation between a content ratio of an actual material and a predicted content ratio of a material obtained by quantifying Raman spectra of FIG. 7A.
Figure 7C:
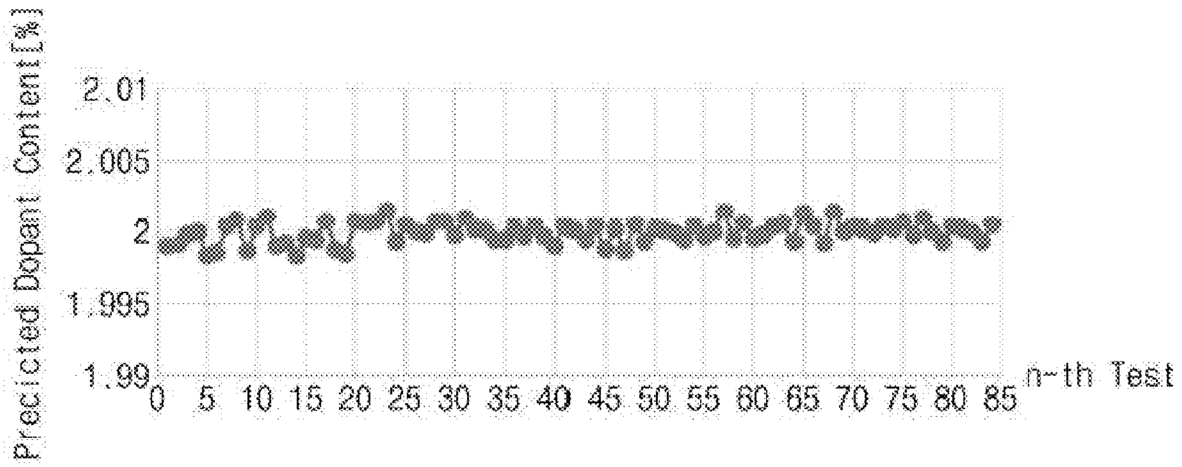
FIG. 7C is a graph showing results of repeated experiments with respect to a sample using an analysis apparatus according to an embodiment of the present disclosure.

FIG. 7A is a graph showing a result of analyzing a sample by Raman spectroscopy using the analysis apparatus AE (refer to FIG. 1A) according to an embodiment of the present disclosure. FIG. 7B is a graph showing a linear correlation between a content ratio of an actual material and a predicted content ratio of a material obtained by quantifying the Raman spectra of FIG. 7A. FIG. 7C is a graph showing results of repeated experiments with respect to a sample using the analysis apparatus AE (refer to FIG. 1A) according to an embodiment of the present disclosure.

FIG. 7A shows Raman spectra RSP1, RSP2, and RSP3 for each dopant content of about 2%, about 4%, and about 6% (e.g., about 2%, about 4%, and about 6% based on 100 wt % of the sample). An x-axis of the graph represents the value of a Raman shift, and a y-axis represents the value of the intensity of the light.

Referring to FIG. 7B, an x-axis shows the actual dopant content, and a y-axis shows the dopant content predicted by quantifying the Raman spectra of FIG. 7A. As a result, the linear correlation between the actual dopant content and the predicted value of the dopant content obtained by quantifying the Raman spectra may be about 99.96%. Thus, according to the result of predicting the dopant content through Raman spectra obtained using the analysis apparatus AE of the present disclosure, the dopant content may be derived to be very close to the actual content ratio. Accordingly, a data accuracy of the analysis apparatus AE of the present disclosure may be verified.

Referring to FIG. 7C, an x-axis relates to the number of tests performed of n tests, and a y-axis relates to a prediction of a dopant content of a result value obtained by the n tests. According to the results of analysis for the dopant content of about 2% (e.g., 2 wt % based on 100 wt % of the sample) using the analysis apparatus AE, the dopant content of about 2.0000005% average and 3σ standard deviation is predicted. For example, because the result values obtained through repeated inspections using the analysis apparatus AE of the present disclosure are constant within a set or predetermined range, a reliability of the analysis apparatus AE may be verified.

In a conventional composition analysis apparatus, when a dopant content is small and/or a thickness of a sample is thin, it is difficult to measure a composition content, and thus, a measurement reliability is low. According to the present disclosure, the dopant content may be quantified using a Raman peak of a Raman spectrum. The analysis apparatus AE according to the present disclosure may quantify samples having an ultra-thin thickness and/or samples containing a trace amount of dopant. In addition, the dopant content of each layer of the sample TO may be also quantified using a confocal function.

In addition, spectrum data of the conventional analysis apparatus using Raman spectroscopy includes fluorescence noise, so the reliability of the spectrum data used to quantify the composition content ratio is low. According to the present disclosure, a Raman peak from which fluorescence noise is removed may be gained or obtained using the laser irradiation unit SLS, the beam scanner BS, the first lens L1, and the optical member OM through which the pin hole PH is defined of the analysis apparatus AE. Accordingly, the reliability of the data obtained to quantify the composition content may be improved. The analysis apparatus of embodiments of the present disclosure has a linear correlation of about 99.96%, which verifies the accuracy of the analysis apparatus, and it is observed that the reliability of the analysis apparatus is improved through the results of the repeated reproducibility tests.

Although embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present disclosure shall be determined according to the attached claims, and equivalents thereof.

What is claimed is:

1. An analysis apparatus comprising:
- a laser irradiation unit that irradiates a laser beam that is a monochromatic light;
- a beam scanner that moves along a pattern to change a position at which the laser beam is irradiated to a sample;
- a first lens through which a light provided from the sample is transmitted;
- an optical member to which the light that passes through the first lens is provided and through which a pin hole is defined; and
- a detection unit that detects a detection light passed through the pin hole,
- wherein the detection light detected by the detection unit is a Raman scattered light and the detection light does not include fluorescence noise, and
- wherein the laser beam is transmitted through the beam scanner to the sample, and
- wherein the beam scanner repeatedly moves along the pattern and repeatedly irradiates the laser beam to the sample, and the pattern is a single closed curve line.

2. The analysis apparatus of claim 1, further comprising a spectral processing unit that processes the Raman scattered light as a spectrum.

3. The analysis apparatus of claim 1, wherein the laser irradiation unit comprises:
- a first laser that irradiates a first laser beam; and
- a second laser that irradiates a second laser beam having a wavelength different from a wavelength of the first laser beam, and the laser irradiation unit outputs the first laser beam or the second laser beam according to a type of the sample.

4. The analysis apparatus of claim 1, further comprising a second lens between the laser irradiation unit and the beam scanner on a travel path of the laser beam.

5. The analysis apparatus of claim 4, further comprising a focus control lens between the second lens and the beam scanner on the travel path of the laser beam, wherein the focus control lens controls a position of a focal point of the laser beam.

6. The analysis apparatus of claim 1, wherein a plurality of points is defined in the sample, and the pattern has a shape corresponding to a shape obtained by connecting the points.

7. The analysis apparatus of claim 1, further comprising a focus control lens between the beam scanner and the sample, wherein the focus control lens controls a position of a focal point of the laser beam.

8. The analysis apparatus of claim 1, further comprising a beam splitter between the laser irradiation unit and the beam scanner on a travel path of the laser beam, wherein the beam splitter changes the travel path of the laser beam.

9. The analysis apparatus of claim 8, further comprising a first half-mirror between the beam splitter and the first lens on a travel path of the light provided from the sample, wherein the first half-mirror changes the travel path of the light provided from the sample.

10. The analysis apparatus of claim 1, further comprising a light irradiation unit that emits a white light, wherein the laser irradiation unit irradiates the laser beam when the light irradiation unit is not emitting the white light to the sample.

11. The analysis apparatus of claim 10, further comprising a third lens in front of the light irradiation unit and that transmits the white light.

12. The analysis apparatus of claim 11, further comprising a second half-mirror that changes a travel path of the white light that passes through the third lens.

13. The analysis apparatus of claim 12, further comprising a microscope to which a light reflected by the sample is incident after passing through the second half-mirror.

14. An analysis method comprising:
- irradiating a white light from a light irradiation unit to a sample;
- irradiating a laser beam that is a high-intensity monochromatic light from a laser irradiation unit to the sample when the light irradiation unit is not irradiating the white light to the sample;
- converting the laser beam to a detection light such that the detection light is incident to an optical system; and
- detecting the detection light using a detection unit,
- wherein the detection light does not include fluorescence noise,
- wherein the laser beam is transmitted through a beam scanner to the sample,
- wherein the beam scanner that moves along a pattern to change a position at which the laser beam is irradiated to the sample, and
- wherein the beam scanner repeatedly moves along the pattern and repeatedly irradiates the laser beam to the sample, and the pattern is a single closed curve line.

15. The analysis method of claim 14, further comprising analyzing a Raman peak detected in the detection light to analyze an intrinsic component of the sample.

16. The analysis method of claim 15, further comprising quantifying a component of the sample using an intensity of the Raman peak, which corresponds to the intrinsic component of the sample, to analyze a material content of the sample.

17. The analysis method of claim 14, wherein the converting of the laser beam to the detection light comprises:
- providing a focus control lens above the sample;
- moving the focus control lens in a thickness direction of the sample; and
- analyzing a component for each layer of the sample.

18. The analysis method of claim 17, wherein the analyzing of the component for each layer of the sample is performed by a two-dimensional analysis analyzing the component of the sample in a specific plane.

19. The analysis method of claim 17, wherein the analyzing of the component for each layer of the sample is performed by a three-dimensional analysis analyzing the component of the sample with respect to a plurality of layers and synthesizing analyzed results of the component.

* * * * *